United States Patent Office 3,042,583
Patented July 3, 1962

3,042,583
WATER-SOLUBLE PROTEIN FROM FISH AIR BLADDER AND INFANT COLIC TREATMENT THEREWITH
Hans Kosenkranius, 2069 Seymour Ave., Cincinnati 37, Ohio
No Drawing. Filed Oct. 15, 1958, Ser. No. 767,293
11 Claims. (Cl. 167—74)

This invention relates to water-soluble protein extracted from fish air bladders and treatment of infant colic therewith.

One of the objects of this invention is the provision of a method for producing a water-soluble protein substantially free of impurities. Another object of the invention is a method of recovering values from the air bladders of fish. Another object of the invention is the provision of a method of stabilizing the values recovered from such fish. Another object of the invention is the provision of a new stable composition of matter, particularly useful in the alleviation of the discomfort of colic in infants. Still another object of the invention is the provision of a method of treating infant colic to alleviate the symptoms thereof.

In general, the objects of this invention are accomplished by producing a water-soluble protein substantially free of impurities by extracting the same from the air bladders of fish. More specifically, a protein extract is produced by boiling the bladders of fish in water and filtering the solution to recover a dissolved product including said protein. Air bladders of the fish, *Centropomus undecimalis*, are preferably used in the process.

This product has been found to produce unusually effective results in ending the discomforts of infant colic for an extended period of time.

Oral dosage from a nursing bottle is a very satisfactory manner of treatment. Single doses will ordinarily vary from about ½ ounce to 1 ounce of the prepared product. Dosage should be repeated periodically until the child has taken from about 3 to 6 ounces over one or two days. Honey or other flavoring may be added to make the product more palatable. Three ounces of the prepared product contains the extract from about ⅓ gram of dried fish bladder.

Under ordinary conditions, the protein-containing filtrate loses its effectiveness rather rapidly. However, it has now been discovered that this difficulty may be obviated either by evaporating to dryness or by the addition of a small percentage, as from 5 to 10%, of a lower alcohol such as methanol, ethanol, propanol or isopropanol. The resulting product may be administered orally in either form to obtain relief of the symptoms of infant colic.

In making the aqueous extraction of the air bladders of fish, the water used for extraction may be at any elevated temperature at or below the boiling point of water. Since higher temperatures provide more efficient operation, extraction will normally be made at the boil. The time of extraction varies in accordance with the temperature, but time can very readily be determined by using as an end point the time at which the stickiness of the bladder disappears.

The invention will be better understood by reference to the following typical examples.

EXAMPLE 1

Approximately 1 gram of the dried air bladder of robalo (*Centropomus undecimalis*) was boiled in 10 ounces of distilled water for from 1 to 2 minutes, and filtered to remove the insoluble residue which was discarded. Of this filtrate, approximately 3 ounces, was given orally in doses of one ounce per hour to an infant suffering from colic. This treatment has been sufficient in every case to alleviate the symptoms of colic and to prevent their return.

Another filtrate sample was prepared in accordance with this example and divided into two equal parts. To one part, 10% by volume of 95% ethyl alcohol was added. After standing four months, there was no evidence of deterioration or decomposition and the stabilized product was still effective in treating infant colic. By contrast, after six days the part of the sample left untreated showed signs of decomposition.

Still another filtrate sample was prepared as in accordance with this example and thereafter evaporated to dryness at 80–90° C. The dried sample was ground and the dried and ground material analyzed. The results of the analysis are presented in Table 1.

Table 1

| | Percent |
|---|---|
| Protein and carbohydrate | 87.60 |
| Sodium as Na | 3.27 |
| Potassium as K | .42 |
| Magnesium as Mg | .20 |
| Sulfur as S: | |
|    Inorganically combined | .70 |
|    Organically combined | .10 |
| Chlorine as Cl: | |
|    Inorganically combined | 5.84 |
|    Organically combined | .47 |
| Total | 98.60 |

The remaining 1.4% of the sample contained traces of calcium carbonate, phosphates, sulfates, bromine, strontium, boron, silicon, fluorine, aluminum, rubidium and lithium.

The mixture of protein and carbohydrate is about 97–98% protein of the following general composition:

| | Percent |
|---|---|
| Arginine | 10–20 |
| Alanine | 40–60 |
| Threonine | 20–30 |

Traces of four other amino acids are present.

Another portion of the dried and ground sample was further purified, stabilized, prepared for compounding, or for analysis by washing with 95% ethyl alcohol, dried and analyzed.

The results of the analysis are presented in Table 2.

Table 2

| | Percent |
|---|---|
| Protein | 98.73 |
| Chlorine, organically combined | .47 |
| Sulfur, inorganically and organically combined | .40 |
| Total | 99.60 |

The remaining .4% contained traces of insoluble phosphates, sulfates and carbonates.

Thus it will be seen that the present invention provides novel methods of preparing new compositions of matter and a new method of treating infant colic by the use of the new compositions.

What I claim is:

1. The process of recovering proteins from the air bladder of *Centropomus undecimalis*, comprising the steps of extracting the air bladder with hot water and filtering the extract.

2. The process of recovering water-soluble proteins from the air bladder of *Centropomus undecimalis*, comprising the steps of extracting the air bladder with hot water and filtering the extract.

3. The process set forth in claim 2 wherein the air bladder is extracted with boiling water for from one to two minutes.

4. The process set forth in claim 2 wherein the air bladder is extracted with boiling water until the air bladder is no longer sticky.

5. The process set forth in claim 2 wherein the filtered extract is stabilized by the addition of ethyl alcohol.

6. The process set forth in claim 2 wherein the filtered extract is stabilized by the removal of water.

7. The method of treating infant colic to alleviate the symptoms thereof, comprising orally administering a solution consisting of an aqueous extract obtained by hot water extraction of the air bladder of *Centropomus undecimalis*.

8. A new composition of matter, valuable in the treatment of infant colic, comprising the filtered aqueous extract obtained by hot water extraction of the air bladder of *Centropomus undecimalis*.

9. A composition of matter consisting essentially of the filtered aqueous extract obtained by hot water extraction of air bladder from *Centropomus undecimalis* and a minor amount of an alcohol.

10. The process of recovering water-soluble proteins from the air bladder of *Centropomus undecimalis*, comprising the steps of extracting the bladder with boiling water, filtering the extract, drying the filtered extract and adding ethanol to the dried residue.

11. The composition of matter made by the process claimed in claim 10.

References Cited in the file of this patent

UNITED STATES PATENTS

| 1,866,633 | Eherenreich | July 12, 1932 |
| 2,522,560 | Benard | Sept. 19, 1950 |